Patented Jan. 21, 1941

2,229,215

UNITED STATES PATENT OFFICE 2,229,215

ANTIFREEZE SUBSTANCE FOR FUEL TANKS

Willett C. Magruder, Jr., Kirkwood, and Alfred C. Korte, St. Louis, Mo., assignors to Carter Carburetor Corporation, St. Louis, Mo., a corporation of Delaware No Drawing. Application February 23, 1938, Serial No. 192,064

3 Claims. (Cl. 44—9)

This invention relates to antifreeze substances, and particularly to such substances used in connection with hydrocarbon fuels under conditions where the fuel and its container, particularly in storage, are subjected to a drop in atmospheric temperature below the dew point, causing water condensation.

An object of this invention is to produce an antifreeze which is readily soluble in water and is substantially immiscible with the fuel.

A further object of the invention is to produce an antifreeze having a density closely approximating that of water, and which, therefore, will seek a level common with water which may be present in a fuel storage tank or supply system, such as used in connection with an automotive vehicle.

A further object of the invention is to produce an antifreeze substance having the above characteristics which, in addition, will prevent rust formation when the fuel contains water and contacts parts, conduits, or fittings of ferrous material.

Liquid fuels are often contaminated by water which has formed in atmospheric storage tanks when a temperature drop below the dew point is experienced. This is particularly true in the fuel system of an automotive vehicle which, in the course of normal operation, is often subjected to widely varying weather conditions, with the result that at low temperatures the collected water may freeze and close fuel lines, fuel pump, and carburetor, thereby preventing the operation of the vehicle.

It has been previously recommended that denatured alcohol be added to the fuel to prevent this condition, but this has been found unsatisfactory, because, while the average commercial alcohol is denser than gasoline, it is substantially less dense than water and tends to become segregated in a layer between both. The denatured alcohols which are readily procurable have a gravity of about .86, and when introduced into a fuel system containing average gasoline ranging in gravity from .70 to .75, without agitation, generally, will not remain dispersed through either to any substantial extent. It is the freezing of the settled water which causes the difficulties mentioned above and, accordingly, it is important that the antifreeze be of substantially the same density as the water, so that it will seek a common level and remain fixed therewith.

Alcohol is also partially soluble in gasoline, which is undesirable, because any so dissolved by the gasoline will not mix with the water.

We have found that certain antifreeze solutions which are freely miscible in water and substantially immiscible in the fuel having antifreeze properties and, being of a density or specific gravity substantially equal to water, when mixed with the fuel, will seek a level common with that of water collected in the system. Such a solution mixing with the water will thereby lower the freezing point of the water, and, if it is introduced in sufficient quantities, will prevent water present in the system from freezing at temperatures experienced during the winter season.

Mixtures of heavy alcohols, such as furfuryl alcohol, glycerine, or ethylene glycol, and light alcohols such as methyl or ethyl alcohols, mixed in such proportions as to have a specific gravity substantially that of water, form a satisfactory antifreeze. Of the above alcohols, ethylene glycol and denatured ethyl alcohol produce the most satisfactory results. However, in order to reduce the tendency of the antifreeze to dissolve in the fuel, we have added a small percentage of water, which also lowers the freezing point of the pure antifreeze and retains the antifreeze characteristics if a portion of the alcohol boils off.

To the above solution, we have added a common inhibitor, such as sulfonated castor oil, to prevent rusting of ferrous material which the antifreeze and condensate water mixture may contact.

Our antifreeze does not foul the engine when carried along with the fuel, inasmuch as the mixture is inflammable and burns freely in the combustion chamber.

A very suitable antifreeze consists of the following proportions in 100 parts

| | Parts by volume |
|---|---|
| Ethylene glycol | 64 |
| Denatured alcohol | 30 |
| Water | 5 |
| Sulfonated castor oil | 1 |

This mixture has a specific gravity substantially equal to that of condensate water.

The exclusive use of all modifications as come within the scope of the appended claims is contemplated.

We claim:

1. The method of preventing freezing of settled water in the lower part of a confined body of liquid hydrocarbon fuel which comprises adding to the body of fuel a quantity of antifreeze solution comprising relatively large portions by volume of a heavy alcohol having a specific gravity greater than water and selected from the group consisting of Glycerine,
        Ethylene glycol, and
        Furfuryl alcohol, a light alcohol having a specific gravity less than water and selected from the group consisting of Ethyl alcohol,
        Methyl alcohol, and a relatively small portion of water, the proportions of the ingredients of said solution being such that the solution is substantially immiscible with and heavier than the hydrocarbon and has a specific gravity approaching that of water, a sufficient quantity of the solution being added so that the solution will sink to the level of and readily mix with settled water and form an immiscible layer therewith, below the hydrocarbon, and lower the freezing point thereof.

2. The method according to claim 1 in which said antifreeze solution is comprised of ingredients substantially in the following proportions by volume:

| | Per cent |
|---|---|
| Heavy alcohol | 64 |
| Light alcohol | 30 |
| Water at least | 5 |

3. The method according to claim 1 in which a relatively small portion of sulphonated castor oil is included in the antifreeze solution as a rust inhibitor.

WILLETT C. MAGRUDER, Jr,
ALFRED C. KORTE.